United States Patent
Fan

(10) Patent No.: US 8,625,472 B2
(45) Date of Patent: Jan. 7, 2014

(54) SYSTEMS AND METHODS FOR PROCESSING TIME-DIVISION SIGNALS AND FREQUENCY-DIVISION SIGNALS

(75) Inventor: Mingjie Fan, Shanghai (CN)

(73) Assignee: Marvell World Trade Ltd., St. Michael (BB)

( * ) Notice: Subject to any disclaimer, the term of this patent is extended or adjusted under 35 U.S.C. 154(b) by 92 days.

(21) Appl. No.: 13/446,485

(22) Filed: Apr. 13, 2012

(65) Prior Publication Data

US 2012/0294205 A1    Nov. 22, 2012

Related U.S. Application Data

(60) Provisional application No. 61/486,705, filed on May 16, 2011.

(51) Int. Cl.
  *H04J 3/00*    (2006.01)
  *H04J 1/00*    (2006.01)
  *H04B 1/44*    (2006.01)
  *H04B 7/00*    (2006.01)

(52) U.S. Cl.
  USPC ............ 370/280; 370/277; 370/281; 370/282

(58) Field of Classification Search
  USPC .......................................................... 370/280
  See application file for complete search history.

(56) References Cited

U.S. PATENT DOCUMENTS

| | | | |
|---|---|---|---|
| 7,096,021 B1 * | 8/2006 | Lehtinen et al. | 455/442 |
| 2006/0253632 A1 * | 11/2006 | Yoshida et al. | 710/71 |
| 2007/0008945 A1 * | 1/2007 | Son et al. | 370/344 |
| 2007/0149127 A1 * | 6/2007 | Karabinis | 455/63.1 |
| 2008/0146144 A1 * | 6/2008 | Rofougaran | 455/3.02 |
| 2010/0202325 A1 | 8/2010 | Poulin et al. | |
| 2010/0203832 A1 * | 8/2010 | Russell et al. | 455/41.2 |
| 2010/0216412 A1 * | 8/2010 | Rofougaran | 455/78 |
| 2012/0201194 A1 * | 8/2012 | Frankland | 370/328 |

OTHER PUBLICATIONS

International Search Report and Written Opinion of the International Searching Authority for Application PCT/IB2012/000849 dated Nov. 30, 2012 (16 pages).

* cited by examiner

*Primary Examiner* — Shripal Khajuria

(57) ABSTRACT

System and methods are provided for processing time-division signals and frequency-division signals using a multi-mode transceiver. The example system includes a power amplifier, a switching component, and a duplexer. The power amplifier is configured to receive a first time-division signal from the transceiver and to generate an amplified time-division signal based on the first time-division signal if the transceiver is in a time-division mode. The power amplifier is further configured to receive a first frequency-division signal from the transceiver and to generate an amplified frequency-division signal based on the first frequency-division signal if the transceiver is in a frequency-division mode. The switching component is configured to receive the amplified time-division signal from the power amplifier, and to output the amplified time-division signal for transmission. The duplexer configured to receive the amplified frequency-division signal from the switching component, and to output a transmission signal for transmission.

18 Claims, 8 Drawing Sheets

SYSTEMS AND METHODS FOR PROCESSING TIME-DIVISION SIGNALS AND FREQUENCY-DIVISION SIGNALS

CROSS-REFERENCE TO RELATED APPLICATIONS

This application claims priority to and benefit from U.S. Provisional Patent Application No. 61/486,705, filed on May 16, 2011, and entitled "Methods to reuse the WCDMA Band1 TX for TDSCDMA Band1/2," the entirety of which is incorporated herein by reference.

FIELD

The technology described in this patent document relates generally to mobile communication. More particularly, systems and methods are disclosed for radio frequency signals processing.

BACKGROUND

Various technical standards are used for sending and receiving radio frequency signals, such as Code Division Multiple Access (CDMA), Global System for Mobile Communication (GSM), Enhanced Data for GSM Environment (EDGE), CDMA-2000, Time Division Synchronous Code Division Multiple Access (TDSCDMA), Wideband Code Division Multiple Access (WCDMA), Long Term Evolution (LTE), and Worldwide Interoperability for Microwave Access (WiMAX).

For example, WCDMA is a widely adopted third-generation (3G) air interface standard. WCDMA supports a Frequency Division Duplex (FDD) mode of operation in which uplink communication (e.g., from a mobile device to a base station) and downlink communication (e.g., from a base station to a mobile device) are carried out on two separate 5 MHz channels. WCDMA includes a number of frequency bands, such as Band 1 which covers 1920 MHz-1980 MHz and 2110 MHz-2170 MHz. The frequency range 1920 MHz-1980 MHz is used for uplink transmission, and the frequency range 2110 MHz-2170 MHz is used for downlink transmission.

TDSCDMA is another 3G air interface standard that implements a Time Division Duplex (TDD) mode of operation in which a same channel is used for both uplink and downlink transmission, and a number of timeslots are dynamically assigned for downlink and uplink transmission. TDSCDMA includes a number of frequency bands, such as Band 1 covering 2010 MHz-2025 MHz, and Band 2 covering 1880 MHz-1920 MHz.

Different areas of the world rely on different technical standards for providing radio frequency communication (e.g., cell phones, beepers, computers, etc.). To enable continual operation of consumer devices that use different standards, multi-mode devices may be provided for communication using each of a number of different standards that may be encountered. For example, dual-mode or tri-mode transceivers are available to transmit/receive WCDMA Band 1 signals and TDSCDMA Band 1/2 signals within a single device. However, communication systems constructed based on the dual-mode or tri-mode transceivers usually include multiple power amplifiers, each being designed specifically for a particular frequency band, or an expensive multi-band multi-mode power amplifier. Additionally, the communication system using the dual-mode or tri-mode transceiver usually includes a number of duplexers and filters, each having a particular bandwidth.

SUMMARY

In accordance with the teachings described herein, systems and methods are provided for processing time-division signals and frequency-division signals using a multi-mode transceiver. An example system may include a power amplifier, a switching component, and a duplexer. The power amplifier is configured to receive a first time-division signal from the transceiver and to generate an amplified time-division signal based on the first time-division signal if the transceiver is in a time-division mode, the power amplifier being further configured to receive a first frequency-division signal from the transceiver and to generate an amplified frequency-division signal based on the first frequency-division signal if the transceiver is in a frequency-division mode. The first time-division signal is associated with a first frequency band, the first frequency-division signal being associated with a second frequency band. Additionally, the first frequency band is adjacent to the second frequency band. The power amplifier has a bandwidth including the first frequency band and the second frequency band. Further, the switching component is configured to receive the amplified time-division signal from the power amplifier and to output the amplified time-division signal for transmission, the switching component being further configured to receive the amplified frequency-division signal from the power amplifier, and to output the amplified frequency-division signal for further processing. Furthermore, the duplexer is configured to receive the amplified frequency-division signal from the switching component and to output a transmission signal for transmission, the transmission signal being generated based on the amplified frequency-division signal.

As another example, a system for processing time-division signals and frequency-division signals using a multi-mode transceiver may include a power amplifier, a switching component, and a duplexer. The power amplifier is configured to receive a first time-division signal from the transceiver and to generate an amplified time-division signal based on the first time-division signal if the transceiver is in a time-division mode, the power amplifier being further configured to receive a first frequency-division signal from the transceiver and to generate an amplified frequency-division signal based on the first frequency-division signal if the transceiver is in a frequency-division mode. The first time-division signal is associated with a first frequency band, the first frequency-division signal being associated with a second frequency band, the first frequency band being adjacent to the second frequency band, the power amplifier having a bandwidth including the first frequency band and the second frequency band. The switching component is configured to receive the amplified time-division signal or the amplified frequency-division signal, and output the amplified time-division signal or the amplified frequency-division signal for further processing. Additionally, the duplexer is configured to receive the amplified time-division signal or the amplified frequency-division signal from the switching component, and to output a first transmission signal generated based on the amplified time-division signal or a second transmission signal generated based on the amplified frequency-division signal to an antenna switch circuit for transmission. The duplexer is further configured to receive a second time-division signal from the antenna switch circuit, and to output a reception signal to the switching component, the reception signal being generated based on the second time-division signal, the duplexer having a bandwidth including the first frequency band and the second frequency band. Furthermore, the switching component is further configured to receive the reception signal and to output the reception signal to the transceiver.

As another example, a method is provided for processing time-division signals and frequency-division signals using a multi-mode transceiver. If the transceiver is in a time-division mode, a time-division signal is received at a power amplifier from the transceiver, the time-division signal being associated with a first frequency band. An amplified time-division signal is generated based on the time-division signal. The amplified time-division signal is output for transmission. If the transceiver is in a frequency-division mode, a frequency-division signal is received at a power amplifier from the transceiver, the frequency-division signal being associated with a second frequency band, the first frequency band being adjacent to the second frequency band, the power amplifier having a bandwidth including the first frequency band and the second frequency band. Additionally, an amplified frequency-division signal is generated based on the frequency-division signal. A transmission signal is generated based on the amplified frequency-division signal at a duplexer. Furthermore, the transmission signal is output for transmission.

As another example, a method is provided for processing time-division signals and frequency-division signals using a multi-mode transceiver. If the transceiver is in a time-division mode, a time-division signal is received at a power amplifier from the transceiver when the transceiver is in a transmission mode, the first time-division signal being associated with a first frequency band. An amplified time-division signal is generated based on the first time-division signal. A first transmission signal is generated based on the amplified time-division signal at a duplexer, the duplexer having a bandwidth including the first frequency band and a second frequency band, the first frequency band being adjacent to the second frequency band. The first transmission signal is output to an antenna switch circuit for transmission. When the transceiver is in a reception mode, a second time-division signal is received from the antenna switch circuit. A reception signal is generated based on the second time-division signal at the duplexer. The reception signal is output to the transceiver. If the transceiver is in a frequency-division mode, a frequency-division signal is received at the power amplifier from the transceiver, the frequency-division signal being associated with the second frequency band, the power amplifier having a bandwidth including the first frequency band and the second frequency band. An amplified frequency-division signal is generated based on the frequency-division signal. Furthermore, a second transmission signal is generated based on the amplified frequency-division signal at the duplexer. The second transmission signal is output to the antenna switch circuit for transmission.

DETAILED DESCRIPTION

Figure 1:
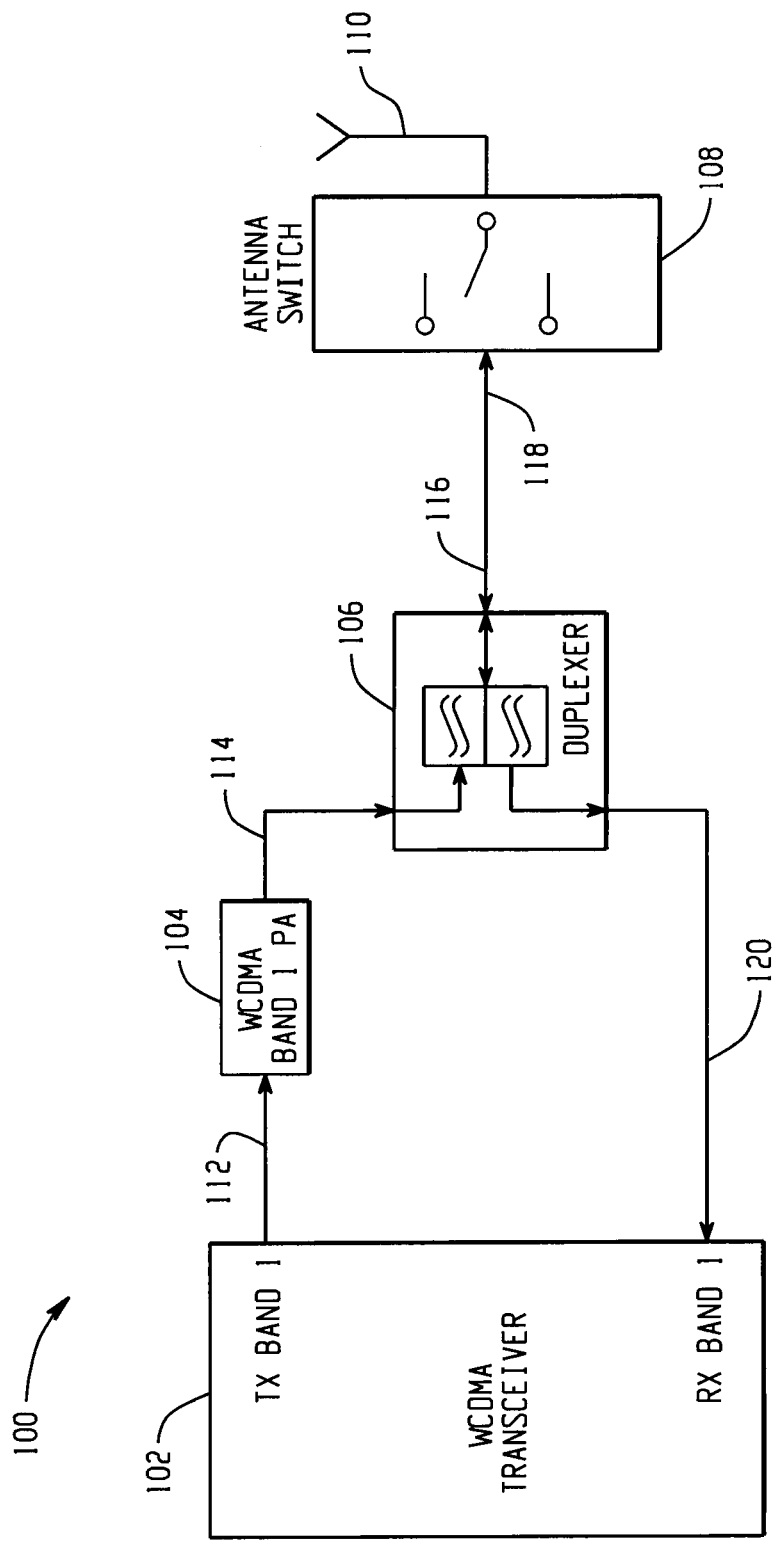
FIG. 1 illustrates an example of a diagram of a conventional communication system for processing WCDMA Band 1 signals.

FIG. 1 illustrates an example of a diagram of a conventional communication system 100 for processing WCDMA Band 1 signals. A WCDMA Band 1 power amplifier 104 amplifies WCDMA signals 112 received from a WCDMA transceiver 102. A duplexer 106 receives amplified WCDMA signals 114 from the power amplifier 104 and outputs transmission signals 116 to an antenna switch 108. Simultaneously, the duplexer 106 can receive WCDMA signals 118 from an antenna switch 108 and output reception signals 120 to the transceiver 102.

Figure 2:
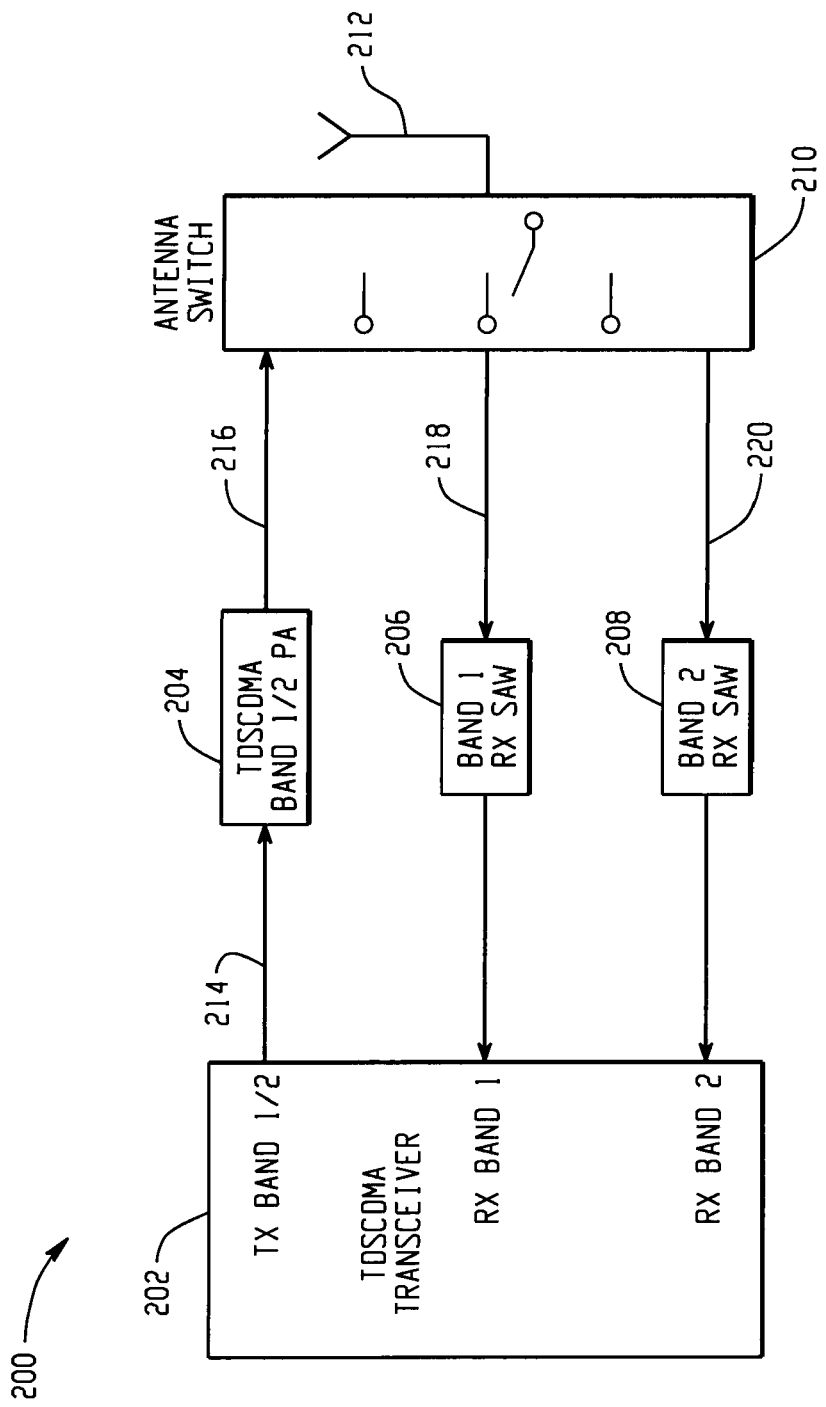
FIG. 2 illustrates an example of a diagram of a conventional communication system for processing TDSCDMA signals.

FIG. 2 illustrates an example of a diagram of a conventional communication system 200 for processing TDSCDMA signals. A TDSCDMA Band 1/2 power amplifier 204 amplifies TDSCDMA Band 1/2 signals 214 received from a TDSCDMA transceiver 202. An antenna switch 210 receives amplified TDSCDMA Band 1/2 signals 216 for transmission. At a different time, the antenna switch 210 routes TDSCDMA Band 1 signals 218 received from an antenna 212 to a Band 1 filter 206, and alternatively routes TDSCDMA Band 2 signals 220 received from the antenna 212 to a Band 2 filter 208. The outputs of the filters 206 and 208 are then transmitted to the transceiver 202.

Certain synergies can be realized when consideration is given to the individual components of the separate conventional systems shown in FIGS. 1 and 2. For example, a WCDMA Band 1 power amplifier (e.g., the power amplifier 104 shown in FIG. 1) often has a bandwidth that covers more than the WCDMA Band 1 uplink frequency range. Thus, the WCDMA Band 1 power amplifier can often process, with satisfactory performance, the TDSCDMA Band 1/2 signals because the TDSCDMA Band 1 (2010 MHz-2025 MHz) and the TDSCDMA Band 2 (1880 MHz-1920 MHz) are adjacent to the WCDMA Band 1 uplink frequency range (1920 MHz-1980 MHz). Similarly, a TDSCDMA Band 1/2 power amplifier (e.g., the power amplifier 204 shown in FIG. 2) has a bandwidth that covers both the TDSCDMA Band 1 and the TDSCDMA Band 2. Because the WCDMA Band 1 uplink frequency range is located between the TDSCDMA Band 1 and the TDSCDMA Band 2, the WCDMA Band 1 uplink frequency range is usually within the bandwidth of a TDSCDMA power amplifier so that the TDSCDMA power amplifier can process the WCDMA Band 1 uplink signals. Thus, a single power amplifier, either the WCDMA Band 1 power amplifier or the TDSCDMA Band 1/2 power amplifier, can be used for a communication system to process both the WCDMA Band 1 uplink signals and the TDSCDMA Band 1/2 signals.

Another synergy can be realized when considering duplexers. As shown in FIG. 1, for processing the WCDMA Band 1 signals, a communication system often needs the duplexer 106 to isolate two different channels used separately for the WCDMA Band 1 uplink communication and downlink communication. However, as shown in FIG. 2, a duplexer is not needed for processing the TDSCDMA Band 1/2 signals because a same channel is used for both the TDSCDMA uplink communication and the TDSCDMA downlink communication. When a multi-mode transceiver is used for processing both the WCDMA Band 1 signals and the TDSCDMA Band 1/2 signals, some conventional communication systems may force the TDSCDMA signals to pass through a duplexer that is only necessary for the WCDMA signals. If the TDSCDMA Band 1/2 signals share a regular duplexer with the WCDMA Band 1 signals, an insertion loss may be caused in the TDSCDMA Band 1/2 signals.

Figure 3:
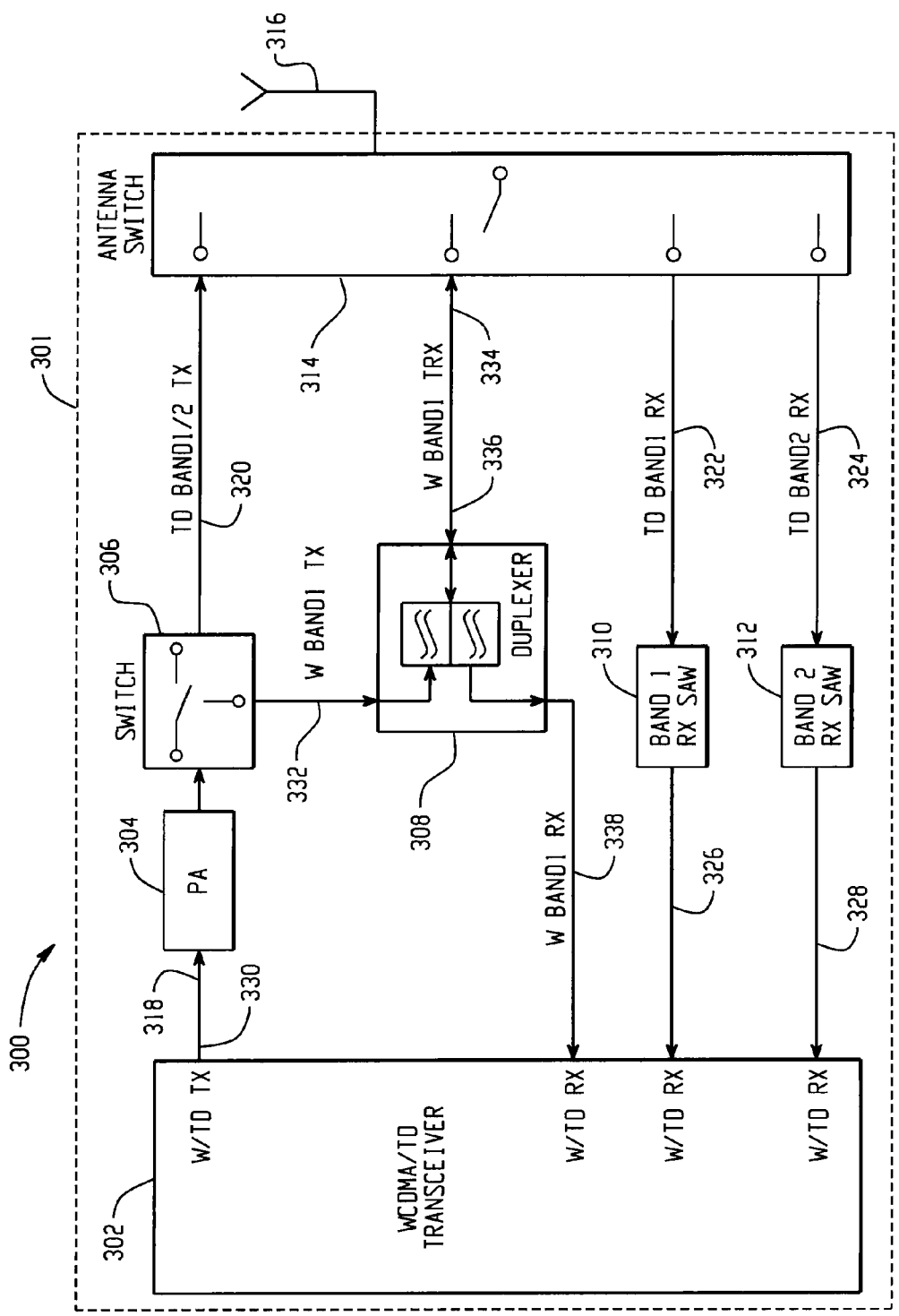
FIG. 3 illustrates an example of a diagram of a communication system for processing WCDMA Band 1 signals using a duplexer and processing TDSCDMA Band 1/2 signals where the duplexer is bypassed.

To take advantage of these observations, a communication system for processing both WCDMA Band 1 signals and TDSCDMA Band 1/2 signals can be constructed using a single power amplifier for both signals and a duplexer only for the WCDMA Band 1 signals, as shown in FIG. 3. FIG. 3 illustrates an example of a diagram of a communication system 300 for processing WCDMA Band 1 signals using a duplexer and processing TDSCDMA Band 1/2 signals where the duplexer is bypassed. The system 300 includes a transceiver chip 301 and an antenna 316. As shown in FIG. 3, the WCDMA Band 1 uplink signals and the TDSCDMA Band 1/2 signals provided by a multi-mode transceiver 302 are amplified by a common power amplifier 304 on the transceiver chip 301. A switch 306 routes the amplified WCDMA signals to a duplexer 308, while the amplified TDSCDMA signals bypass the duplexer 308 via the switch 306.

Specifically, when the communication system 300 is in a transmission mode, signals are transmitted from the transceiver 302 to the antenna switch 314. If the transceiver 302 is configured to output a TDSCDMA Band 1/2 signal 318, then the power amplifier 304 amplifies the signal 318, and the switch 306 routes the amplified TDSCDMA signal 320 to an antenna switch 314 for transmission. If the transceiver 302 is configured to output a WCDMA Band 1 uplink signal 330, the power amplifier 304 amplifies the signal 330, the switch 306 routes an amplified WCDMA signal 332 to the duplexer 308, and the duplexer 308 outputs a transmission signal 334 to the antenna switch 314 for transmission.

When the system 300 is in a reception mode, signals are transmitted from the antenna switch 314 to the transceiver 302. When the antenna 316 receives a TDSCDMA Band 1 signal 322, the antenna switch 314 routes the signal 322 to a TDSCDMA Band 1 filter 310 that outputs a filtered signal 326 to the transceiver 302. If the antenna 316 receives a TDSCDMA Band 2 signal 324, the antenna switch 314 routes the signal 324 to the TDSCDMA Band 2 filter 312 that in turn outputs a filtered signal 328 to the transceiver 302. When the antenna 316 receives a WCDMA Band 1 downlink signal 336, the antenna switch 314 routes the signal 336 to the duplexer 308, which outputs a reception signal 338 to the transceiver 302.

As discussed above, the power amplifier 304 can be a WCDMA Band 1 power amplifier, or a TDSCDMA Band 1/2 power amplifier. However, any other power amplifiers with a bandwidth that covers the WCDMA Band 1 uplink frequency range, the TDSCDMA Band 1 and the TDSCDMA Band 2 may be utilized as well.

The depicted system 300 supports both TDSCDMA and WCDMA transmissions. In addition, the transceiver 302 may support one or more of the following air interface standards: CDMA, GSM, EDGE, CDMA-2000, LTE, and WiMax.

The system 300 may be varied in a number of ways while still offering satisfactory performance. For example, the switch 306 may be a single pole, double throw (SPDT) switch. The antenna switch 314 may be a single pole, multi-throw switch. The filters 310 and 312 may be surface acoustic wave (SAW) filters. Other variations are also contemplated as being within the scope of this disclosure.

Figure 4:
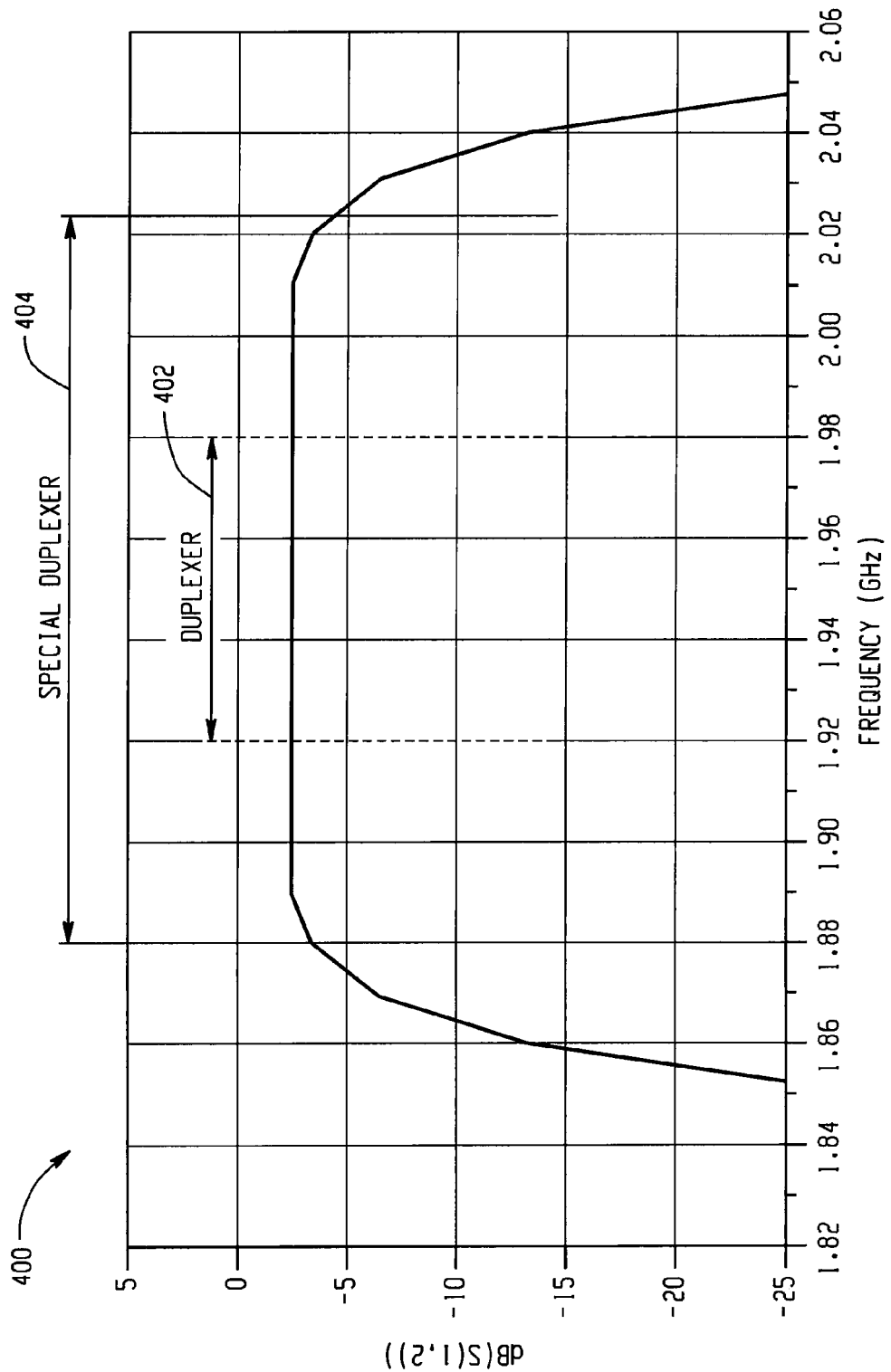
FIG. 4 illustrates an example of a diagram showing frequency coverage of a special duplexer that may be utilized for a communication system using a multi-mode transceiver.

FIG. 4 illustrates an example of a diagram showing frequency coverage of a special duplexer that may be utilized for a communication system using a multi-mode transceiver. As noted previously with respect to FIG. 3, the TDSCDMA signals can bypass the duplexer 306 to avoid insertion loss. Such loss results from conventional duplexers having a bandwidth (as shown at 402) which does not cover the TDSCDMA Band1/2. A special duplexer can be constructed to have an extended bandwidth cover the WCDMA Band 1, the TDSCDMA Band 1, and the TDSCDMA Band 2, as shown at 404. Such a special duplexer can be used to process the TDSCDMA Band 1/2 signals without significant insertion loss. Thus, a communication system can be constructed using the special duplexer to further simplify system structure, as shown in FIG. 5.

Figure 5:
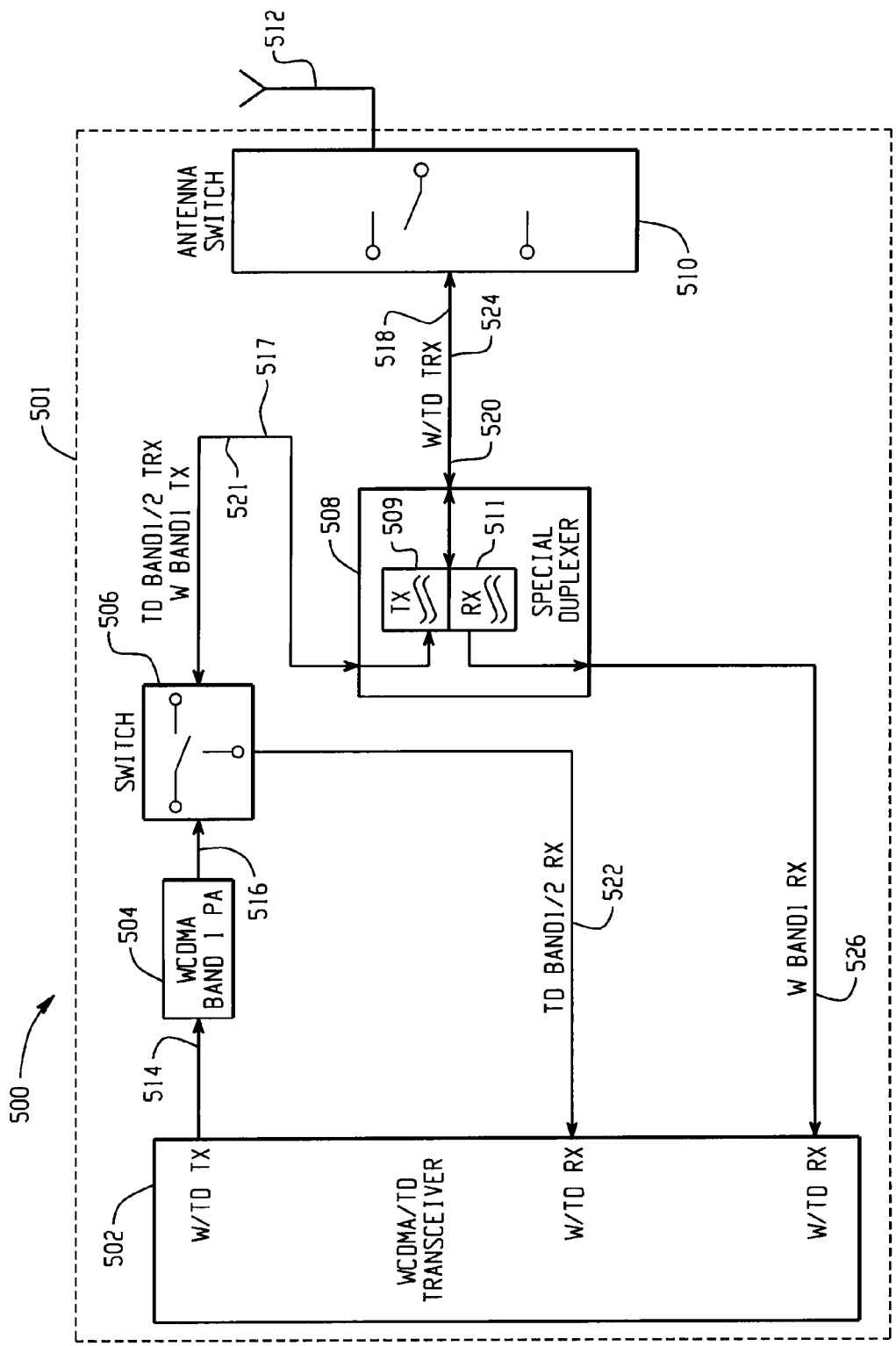
FIG. 5 illustrates an example of a diagram of a communication system for processing WCDMA Band 1 signals and TDSCDMA Band 1/2 signals using a special duplexer.

FIG. 5 illustrates an example of a diagram of a communication system 500 for processing WCDMA Band 1 signals and TDSCDMA Band 1/2 signals using a special duplexer. The system 500 includes a transceiver chip 501 and an antenna 512. As shown in FIG. 5, a special duplexer 508 with an extended bandwidth is used for processing both the WCDMA Band 1 signals and the TDSCDMA Band 1/2 signals.

When the system 500 is in a transmission mode, signals are transmitted from a multi-mode transceiver 502 to an antenna switch 510. The transceiver 502 outputs a signal 514 (e.g., a TDSCDMA Band 1/2 signal or a WCDMA Band 1 uplink signal) to a power amplifier 504. A switch 506 receives an amplified signal 516 and outputs a signal 517 to the special duplexer 508 (e.g., at a transmission port 509 of the special duplexer 508). Then the special duplexer 508 outputs a transmission signal 518 to the antenna switch 510 for transmission.

When the system 500 is in a reception mode, signals are transmitted from the antenna switch 510 to the transceiver 502. When the antenna 512 receives a TDSCDMA Band 1/2 signal 520, the antenna switch 510 routes the signal 520 to the special duplexer 508, and the special duplexer 508 outputs a signal 521 (e.g., through the transmission port 509) to the switch 506, which then outputs a signal 522 to the transceiver 502. When the antenna 512 receives a WCDMA Band 1 downlink signal 524, the antenna switch 510 routes the signal 524 to the special duplexer 508, and the special duplexer 508 outputs a reception signal 526 (e.g., through a reception port 511 of the duplexer 508) to the transceiver 502.

For example, the power amplifier 504 can be a WCDMA Band 1 power amplifier, or a TDSCDMA Band 1/2 power amplifier. However, any other power amplifiers with a bandwidth that covers the WCDMA Band 1 uplink frequency range, the TDSCDMA Band 1 and the TDSCDMA Band 2 may be utilized as well.

Figure 6:
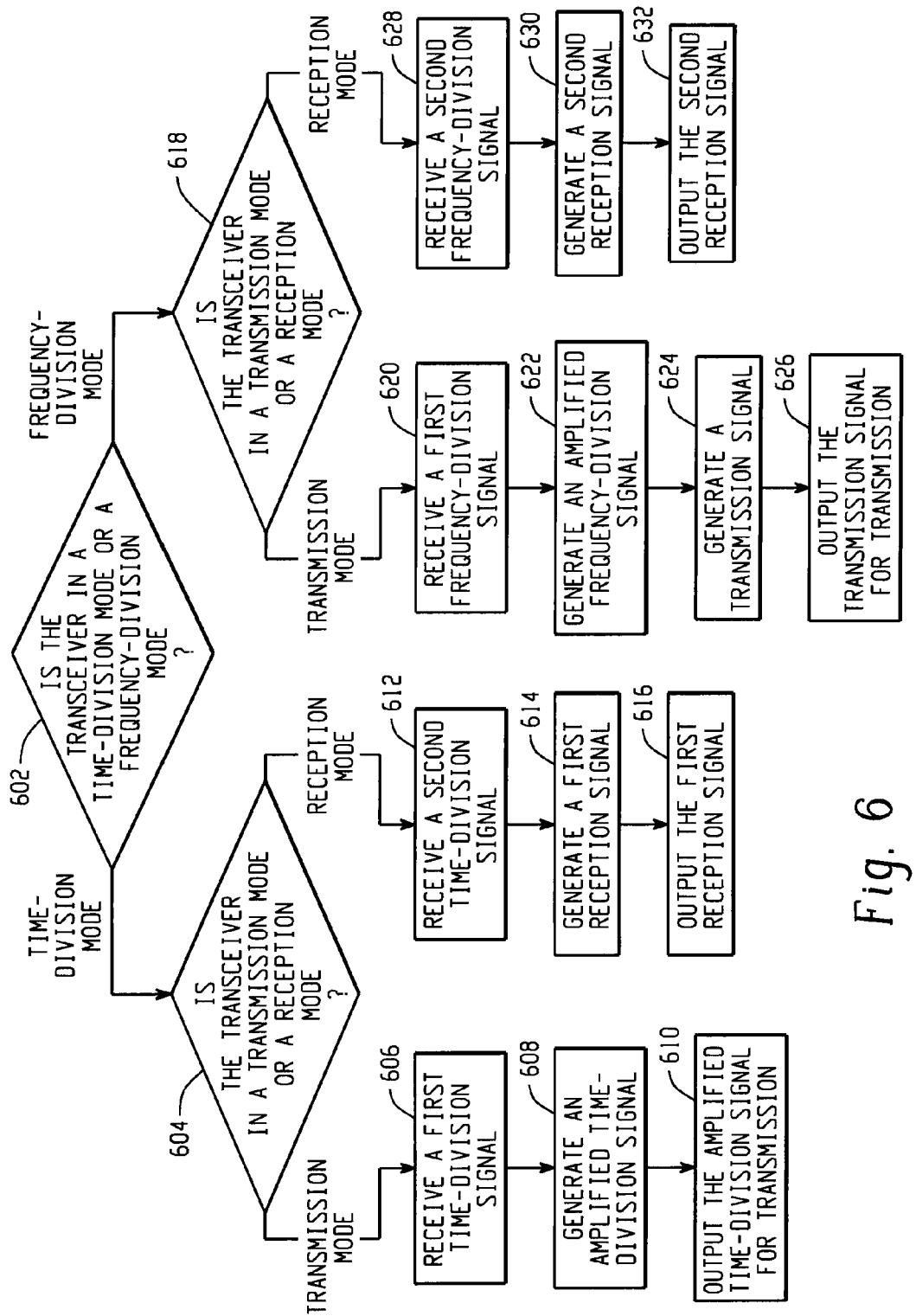
FIG. 6 illustrates an example flow diagram depicting a method for processing frequency-division signals in a frequency-division mode using a duplexer and processing time-division signals in a time-division mode where the duplexer is bypassed.

FIG. 6 illustrates an example flow diagram depicting a method for processing frequency-division signals in a frequency-division mode using a duplexer and processing time-division signals in a time-division mode where the duplexer is bypassed. At 602, a determination is made as to whether the transceiver is in a time-division mode or a frequency-division mode. When the transceiver is in the time-division mode, a determination is made as to whether the transceiver is in a transmission mode or a reception mode at 604. When the transceiver is in the transmission mode, a first time-division signal (e.g., a TDSCDMA Band 1/2 signal) is received at a power amplifier from the transceiver at 606. The first time-division signal is associated with a first frequency band (e.g., the TDSCDMA Band 1 and Band 2). An amplified time-division signal is generated based on the time-division signal at 608, and the amplified time-division signal is output to an antenna switch circuit for transmission at 610. When the transceiver is in the reception mode, a second time-division signal (e.g., a TDSCDMA Band 1/2 signal) is received from the antenna switch circuit at 612. The second time-division signal is associated with the first frequency band. A first reception signal is generated at a filter based on the second time-division signal at 614, and output to the transceiver at 616. For example, if the second time-division signal is a TDSCDMA Band 1 signal, the first reception signal is generated at a TDSCDMA Band 1 filter. If the second time-division signal is a TDSCDMA Band 2 signal, the first reception signal is generated at a TDSCDMA Band 2 filter.

When the transceiver is in the frequency-division mode, a determination is made as to whether the transceiver is in a transmission mode or a reception mode at 618. When the transceiver is in the transmission mode, a first frequency-division signal (e.g., a WCDMA Band 1 uplink signal) is received at the power amplifier from the transceiver at 620. The first frequency-division signal is associated with a second frequency band (e.g., the WCDMA Band 1 uplink frequency range), where the first frequency band is adjacent to the second frequency band. Because the power amplifier has a bandwidth including the first frequency band and the second frequency band, the same amplifier is used for both branches of the depicted process. An amplified frequency-division signal is generated based on the frequency-division signal at 622. A transmission signal is generated based on the amplified frequency-division signal at a duplexer at 624, and the transmission signal is output to the antenna switch circuit for transmission at 626. When the transceiver is in the reception mode, a second frequency-division signal is received from the antenna switch circuit at 628. A second reception signal is generated based on the second frequency-division signal at the duplexer at 630, and output to the transceiver via a switch at 632.

As an example, the method depicted in FIG. 6 is implemented in the communication system 300 as shown in FIG. 3 for processing WCDMA Band 1 signals using a duplexer and processing TDSCDMA Band 1/2 signals where the duplexer is bypassed.

Figure 7:
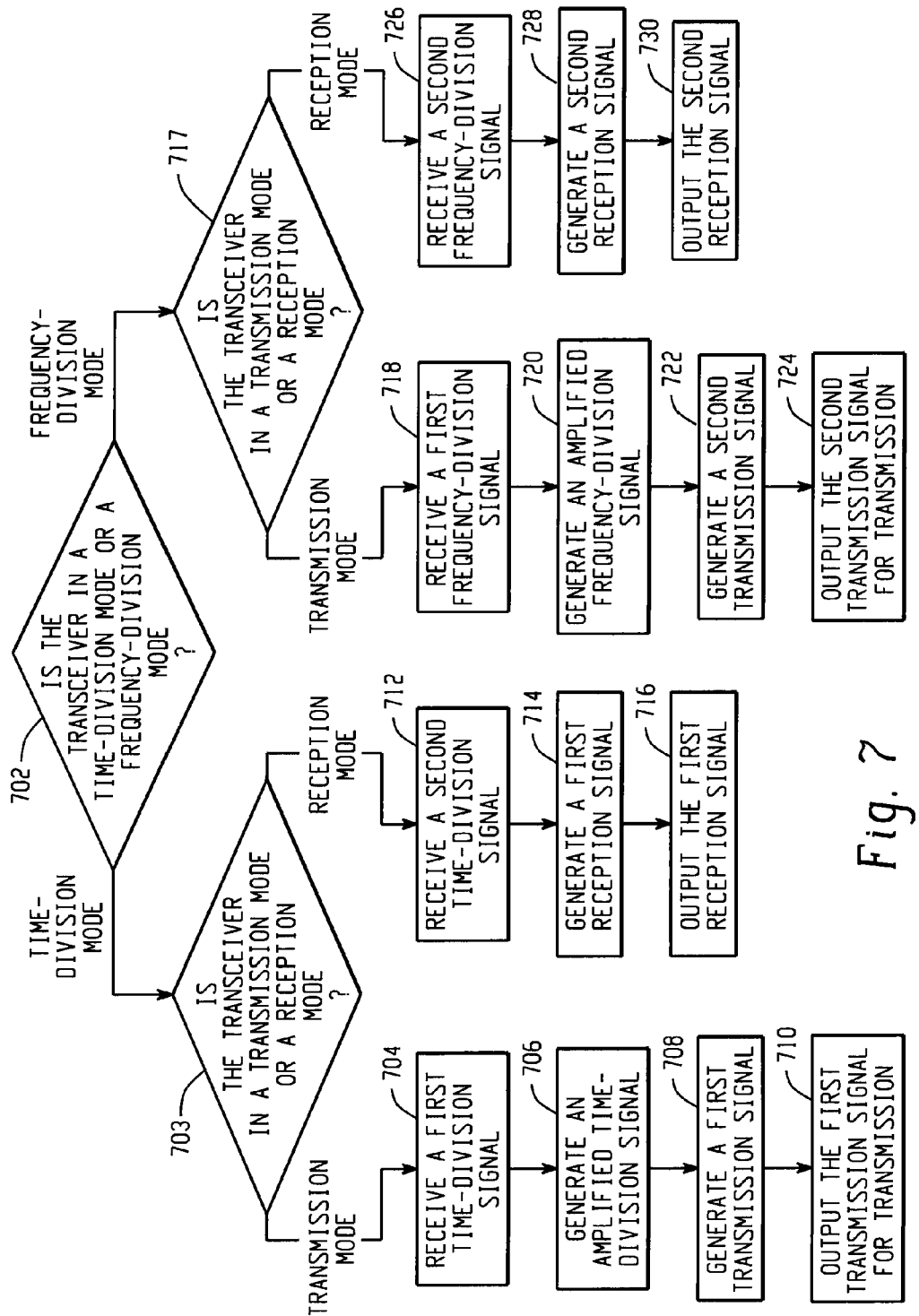
FIG. 7 illustrates an example flow diagram depicting a method for processing time-division signals in a time-division mode and frequency-division signals in a frequency-division mode using a special duplexer.

FIG. 7 illustrates an example flow diagram depicting a method for processing time-division signals in a time-division mode and frequency-division signals in a frequency-division mode using a special duplexer. At 702, a determination is made as to whether the transceiver is in a time-division mode or a frequency-division mode. When the transceiver is in the time-division mode, a determination is made as to whether the transceiver is in a transmission mode or a reception mode at 703. When the transceiver is in the transmission mode, a first time-division signal (e.g., a TDSCDMA Band 1/2 signal) is received at a power amplifier from the transceiver at 704. The first time-division signal is associated with a first frequency band (e.g., the TDSCDMA Band 1 and Band 2), and an amplified time-division signal is generated based on the first time-division signal at 706. For example, the amplified time-division signal passes through a switch and is filtered by a duplexer. At 708, a first transmission signal is generated based on the amplified time-division signal at the duplexer that has a bandwidth that includes both the first frequency band and a second frequency band (e.g., the WCDMA Band 1 uplink frequency range), where the first frequency band is adjacent to the second frequency band. The first transmission signal is output to an antenna switch circuit for transmission at 710. When the transceiver is in the reception mode, a second time-division signal is received from the antenna switch circuit at 712. A first reception signal is generated based on the second time-division signal at the duplexer at 714, and is output to the transceiver at 716 via the switch. For example, the second time-division signal is filtered by the duplexer.

When the transceiver is in the frequency-division mode, a determination is made as to whether the transceiver is in a transmission mode or a reception mode at 717. When the transceiver is in the transmission mode, a first frequency-division signal (e.g., a WCDMA Band 1 uplink signal) is received at the power amplifier from the transceiver at 718. The first frequency-division signal is associated with the second frequency band. Because the power amplifier has a bandwidth that includes both the first frequency band and the second frequency band, the same power amplifier can be used for both branches of the process. At 720, an amplified frequency-division signal is generated based on the first frequency-division signal. For example, the amplified frequency-division signal passes through the switch and is filtered by the duplexer. A second transmission signal is generated based on the amplified frequency-division signal at the duplexer at 722, and the second transmission signal is output to the antenna switch circuit for transmission at 724. When the transceiver is in the reception mode, a second frequency-division signal is received from the antenna switch circuit at 726. A second reception signal is generated based on the second time-division signal at the duplexer at 728, and the second reception signal is output to the transceiver at 730. For example, the second time-division signal is filtered by the duplexer.

As an example, the method depicted in FIG. 7 is implemented in the communication system 500 as shown in FIG. 5 for processing WCDMA Band 1 signals and TDSCDMA Band 1/2 signals using a special duplexer.

Figure 8:
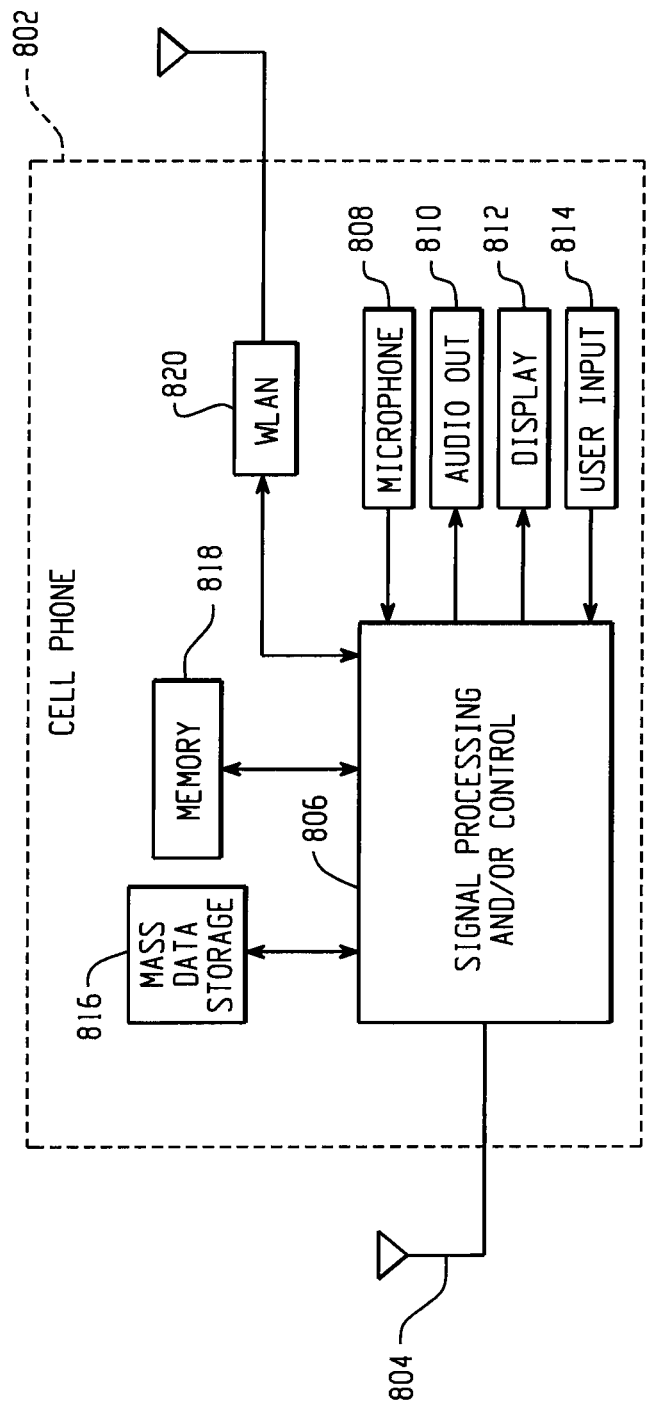
FIG. 8 illustrates an exemplary implementation of processing time-division signals and frequency-division signals.

Referring now to FIG. 8, an exemplary implementation of the present invention is shown. The present invention may be embodied in a cellular phone 802 that may include a cellular antenna 804. Processing time-division signals and frequency-division signals according to the present invention may implement either or both signal processing and/or control circuits, which are generally identified in FIG. 8 at 806, a WLAN interface and/or mass data storage of the cellular phone 802. In some implementations, cellular phone 802 includes a microphone 808, an audio output 810 such as a speaker and/or audio output jack, a display 812 and/or an input device 814 such as a keypad, pointing device, voice actuation and/or other input device. Signal processing and/or control circuits 806 and/or other circuits (not shown) in cellular phone 802 may process data, perform coding and/or encryption, perform calculations, format data and/or perform other cellular phone functions.

Cellular phone 802 may communicate with mass data storage 816 that stores data in a nonvolatile manner such as optical and/or magnetic storage devices for example hard disk drives HDD and/or DVDs. The HDD may be a mini HDD that includes one or more platters having a diameter that is smaller than approximately 1.8". Cellular phone 802 may be connected to memory 818 such as RAM, ROM, low latency nonvolatile memory such as flash memory and/or other suitable electronic data storage. Cellular phone 802 also may support connections with a WLAN via a WLAN network interface 820.

This written description uses examples to disclose the invention, include the best mode, and also to enable a person skilled in the art to make and use the invention. The patentable scope of the invention may include other examples that occur to those skilled in the art.

As an example, systems and methods can be configured as disclosed herein to simplify wireless communication systems that can process both time-division signals and frequency-division signals. As another example, systems and methods can be configured as disclosed herein to reduce the number of power amplifiers used in wireless communication systems. As another example, systems and methods can be configured as disclosed herein to reduce the number of radio-frequency-signal filters used in wireless communication systems. As another example, systems and methods can be configured as disclosed herein to reduce layout area needed in wireless communication systems and save manufacturing costs.

It is claimed:

1. A system for processing time-division signals and frequency-division signals using a multi-mode transceiver, the system comprising:
   a power amplifier configured to receive a first time-division signal from the multi-mode transceiver and to generate an amplified time-division signal based on the first time-division signal when the multi-mode transceiver is in a time-division mode, the power amplifier being further configured to receive a first frequency-division signal from the multi-mode transceiver and to generate an amplified frequency-division signal based on the first frequency-division signal when the multi-mode transceiver is in a frequency-division mode,
   the first time-division signal being associated with a first frequency band, the first frequency-division signal being associated with a second frequency band, the first frequency band being adjacent to the second frequency band, and the power amplifier having a bandwidth including the first frequency band and the second frequency band;
   a switching component configured to receive the amplified time-division signal from the power amplifier and to output the amplified time-division signal for transmission, the switching component being further configured to receive the amplified frequency-division signal from the power amplifier and to output the amplified frequency-division signal; and
   a duplexer configured to receive the amplified frequency-division signal from the switching component and to output a transmission signal for transmission;
   wherein the second frequency band ranges from 1920 MHz to 1980 MHz, and
   wherein the first frequency band includes a third frequency band and a fourth frequency band, the third frequency band ranging from 2010 MHz to 2025 MHz, the fourth frequency band ranging from 1880 MHz to 1920 MHz.

2. The system of claim 1 wherein the first time-division signal is a Time Division Synchronous Code Division Multiple Access (TDSCDMA) signal.

3. The system of claim 1 wherein the first frequency-division signal is a Wideband Code Division Multiple Access (WCDMA) signal.

4. The system of claim 1 wherein the power amplifier is a TDSCDMA Band 1/2 power amplifier, a WCDMA Band 1 power amplifier, or a power amplifier that has a bandwidth including both the first frequency band and the second frequency band.

5. The system of claim 1, further comprising:
   an antenna switch circuit configured to receive the amplified time-division signal and to receive the transmission signal.

6. The system of claim 5 wherein the duplexer is further configured to receive a second frequency-division signal from the antenna switch circuit and to output a first reception signal to the multi-mode transceiver, the first reception signal being generated based on the second frequency-division signal.

7. The system of claim 6, further comprising:
   a first time-division filter configured to receive a second time-division signal from the antenna switch circuit and to output a second reception signal to the multi-mode transceiver, the second time-division signal being associated with the third frequency band, the second reception signal being generated based on the second time-division signal; and
   a second time-division filter configured to receive a third time-division signal from the antenna switch circuit and to output a third reception signal to the multi-mode transceiver, the third time-division signal being associated with the fourth frequency band, the third reception signal being generated based on the third time-division signal.

8. The system of claim 7 wherein the antenna switch circuit includes a single pole multiple throw switch.

9. The system of claim 1 wherein the switching component is a single pole double throw switch.

10. The system of claim 1 wherein the duplexer has a bandwidth including the second frequency band.

11. The system of claim 1 wherein the multi-mode transceiver supports WCDMA, TDSCDMA, and one or more of the following standards: Code Division Multiple Access (CDMA), Global System for Mobile Communication (GSM), Enhanced Data for GSM Environment (EDGE), CDMA-2000, Long Term Evolution (LTE), and Worldwide Interoperability for Microwave Access (WiMAX).

12. A system for processing time-division signals and frequency-division signals using a multi-mode transceiver, the system comprising:
   a power amplifier configured to receive a first time-division signal from the multi-mode transceiver and to generate an amplified time-division signal based on the first time-division signal when the multi-mode transceiver is in a time-division mode, the power amplifier being further configured to receive a first frequency-division signal from the multi-mode transceiver and to generate an amplified frequency-division signal based on the first frequency-division signal when the multi-mode transceiver is in a frequency-division mode,
   the first time-division signal being associated with a first frequency band, the first frequency-division signal being associated with a second frequency band, the first frequency band being adjacent to the second frequency band, and the power amplifier having a bandwidth including the first frequency band and the second frequency band;
   a switching component configured to receive the amplified time-division signal or the amplified frequency-division signal, and output the amplified time-division signal or the amplified frequency-division signal for further processing; and
   a duplexer configured to receive the amplified time-division signal or the amplified frequency-division signal from the switching component and to output a first transmission signal generated based on the amplified time-division signal or a second transmission signal generated based on the amplified frequency-division signal to an antenna switch circuit for transmission, the duplexer being further configured to receive a second time-division signal from the antenna switch circuit and to output a reception signal to the switching component, the reception signal being generated based on the second time-division signal;

the switching component being further configured to receive the reception signal and to output the reception signal to the multi-mode transceiver;

wherein the second frequency band ranges from 1920 MHz to 1980 MHz, and wherein the first frequency band includes a third frequency band and a fourth frequency band, the third frequency band ranging from 2010 MHz to 2025 MHz, the fourth frequency band ranging from 1880 MHz to 1920 MHz.

13. The system of claim 12 wherein the duplexer is further configured to receive a second frequency-division signal from the antenna switch circuit, and to output a second reception signal to the multi-mode transceiver, the second reception signal being generated based on the second frequency-division signal.

14. The system of claim 13 wherein:
the duplexer includes a first port and a second port; and
the duplexer is further configured to receive the second time-division signal at the first port from the antenna switch circuit and to receive the second frequency-division signal at the second port from the antenna switch circuit.

15. The system of claim 12 wherein the power amplifier is a TDSCDMA Band 1/2 power amplifier, a WCDMA Band 1 power amplifier, or a power amplifier that has a bandwidth including both the first frequency band and the second frequency band.

16. The system of claim 12 wherein the duplexer having a bandwidth including the first frequency band and the second frequency band.

17. A method for processing time-division signals and frequency-division signals using a multi-mode transceiver, the method comprising:
(a) when the multi-mode transceiver is in a time-division mode,
  (i) when the multi-mode transceiver is in a transmission mode,
    receiving, at a power amplifier, a first time-division signal from the multi-mode transceiver, the first time-division signal being associated with a first frequency band;
    generating an amplified time-division signal based on the first time-division signal;
    outputting the amplified time-division signal to an antenna switch circuit for transmission;
  (ii) when the multi-mode transceiver is in a reception mode,
    receiving a second time-division signal from the antenna switch circuit, the second time-division signal being associated with the first frequency band;
    generating a first reception signal based on the second time-division signal;
    outputting the first reception signal to the multi-mode transceiver;
(b) when the multi-mode transceiver is in a frequency-division mode,
  (i) when the multi-mode transceiver is in a transmission mode,
    receiving, at a power amplifier, a first frequency-division signal from the multi-mode transceiver, the first frequency-division signal being associated with a second frequency band, the first frequency band being adjacent to the second frequency band, the power amplifier having a bandwidth including the first frequency band and the second frequency band;
    generating an amplified frequency-division signal based on the first frequency-division signal;
    generating a transmission signal based on the amplified frequency-division signal at a duplexer;
    outputting the transmission signal for transmission;
  (ii) when the multi-mode transceiver is in a reception mode,
    receiving a second frequency-division signal from the antenna switch circuit;
    generating a second reception signal based on the second frequency-division signal at the duplexer; and
    outputting the second reception signal to the multi-mode transceiver via a switch;
wherein the second frequency band ranges from 1920 MHz to 1980 MHz, and
wherein the first frequency band includes a third frequency band and a fourth frequency band, the third frequency band ranging from 2010 MHz to 2025 MHz, the fourth frequency band ranging from 1880 MHz to 1920 MHz.

18. A method for processing time-division signals and frequency-division signals using a multi-mode transceiver, the method comprising:
(a) when the multi-mode transceiver is in a time-division mode,
  (i) when the multi-mode transceiver is in a transmission mode,
    receiving, at a power amplifier, a first time-division signal from the multi-mode transceiver, the first time-division signal being associated with a first frequency band;
    generating an amplified time-division signal based on the first time-division signal;
    generating a first transmission signal based on the amplified time-division signal at a duplexer, the duplexer having a bandwidth including the first frequency band and a second frequency band, the first frequency band being adjacent to the second frequency band;
    outputting the first transmission signal to an antenna switch circuit for transmission;
  (ii) when the multi-mode transceiver is in a reception mode,
    receiving a second time-division signal from the antenna switch circuit;
    generating a first reception signal based on the second time-division signal at the duplexer;
    outputting the first reception signal to the multi-mode transceiver;
(b) when the multi-mode transceiver is in a frequency-division mode,
  (i) when the multi-mode transceiver is in a transmission mode,
    receiving, at the power amplifier, a first frequency-division signal from the multi-mode transceiver, the first frequency-division signal being associated with the second frequency band, the power amplifier having a bandwidth including the first frequency band and the second frequency band;
    generating an amplified frequency-division signal based on the first frequency-division signal;

generating a second transmission signal based on the amplified frequency-division signal at the duplexer;
outputting the second transmission signal to the antenna switch circuit for transmission;
(ii) when the multi-mode transceiver is in a reception mode,
receiving a second frequency-division signal from the antenna switch circuit;
generating a second reception signal based on the second frequency-division signal at the duplexer; and
outputting the second reception signal to the multi-mode transceiver via a switch;
wherein the second frequency band ranges from 1920 MHz to 1980 MHz, and wherein the first frequency band includes a third frequency band and a fourth frequency band, the third frequency band ranging from 2010 MHz to 2025 MHz, the fourth frequency band ranging from 1880 MHz to 1920 MHz.

* * * * *